Figure 1:
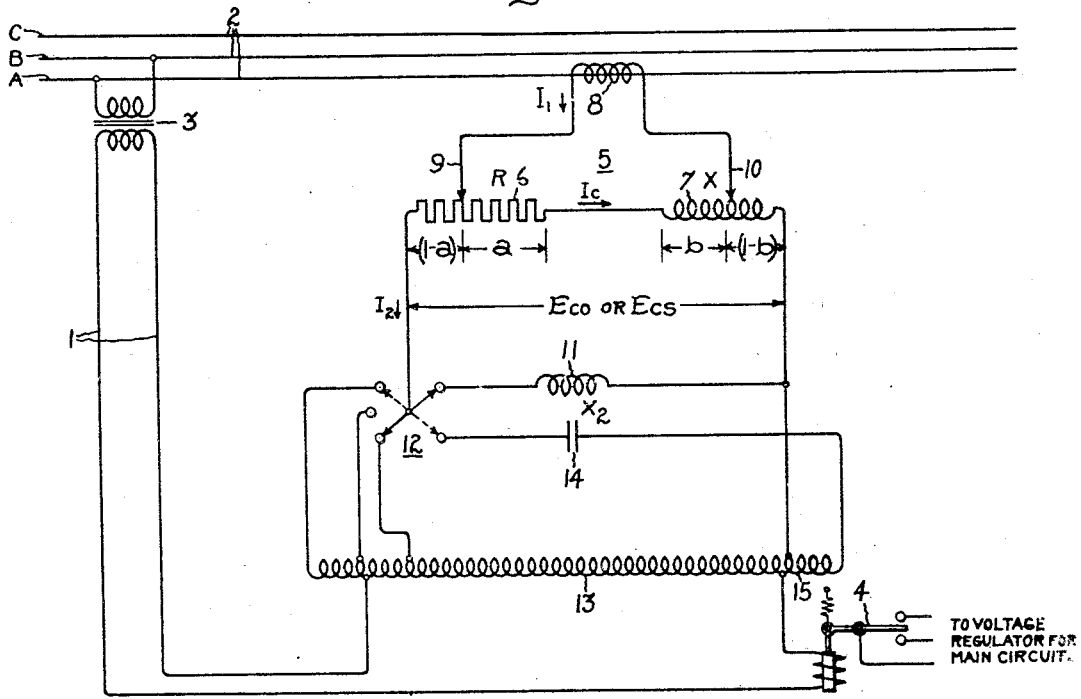

March 11, 1941.　　　H. R. WEST　　　2,234,746

ELECTRIC CIRCUIT

Filed June 1, 1938

30° { LAG OF CURRENT FOR ABC PHASE ROTATION (COUNTER CLOCKWISE)
　　　LEAD OF CURRENT FOR ACB PHASE ROTATION (CLOCKWISE)

Inventor:
Harry R. West,
by Harry E. Dunham
His Attorney.

Patented Mar. 11, 1941

2,234,746

UNITED STATES PATENT OFFICE 2,234,746

ELECTRIC CIRCUIT

Harry R. West, Pittsfield, Mass., assignor to General Electric Company, a corporation of New York Application June 1, 1938, Serial No. 211,135

12 Claims. (Cl. 171—119)

This invention relates to electric circuits and more particularly to improvements in phase shifting circuits for line drop compensators.

A line drop compensator is a device which compensates a voltage measuring instrument for the voltage drop or rise in a given length of a current-carrying circuit whose voltage is to be measured. For example, if the voltage measuring device is a voltage regulating relay which is connected across a power line at a given point and which is to cause the regulator to hold constant voltage at another point on the power line, a line drop compensator is used to compensate the relay for the voltage difference or drop between the constant voltage point and the point to which the relay is connected. This voltage difference is caused by the line current flowing through the resistance and reactance of the line.

Sometimes the voltage to which the measuring device responds and the current to which the line drop compensator responds are out of phase with each other at unity power factor on the main circuit. For example, if the voltage regulating relay is connected between two of the lines of a three-phase power circuit and the line drop compensator is connected to carry a current proportional to the current in one of the two lines across which the relay is connected, the current and the voltage will be 30° out of phase at unity power factor. This angle may either be an angle of lag or an angle of lead, depending upon the connections or the phase rotation of the main circuit. Such connections are common when two single-phase voltage regulators are connected open-delta for regulating the voltage of a three-phase circuit. Unless a correction is made for this 30° phase displacement, improper line drop compensation will be produced.

In accordance with this invention the phase of the line drop compensator voltage is shifted through any desired angle by means of a properly proportioned impedance arrangement connected in shunt circuit relation with both the resistance element and the reactance element of the compensator. A simple form of impedance arrangement which gives good results is a substantially pure reactance, either inductive or capacitative.

An object of the invention is to provide a new and improved electric circuit.

Another object of the invention is to provide a new and improved phase shifting circuit.

An additional object of the invention is to provide a simple and inexpensive line drop compensator adapted for use with currents which are out of phase with the voltage of the compensated measuring circuit at unity power factor on the measured circuit.

A still further object of the invention is to provide a new and improved line drop compensator.

The invention will be better understood from the following description taken in connection with the accompanying drawing, and its scope will be pointed out in the appended claims.

Figure 2:
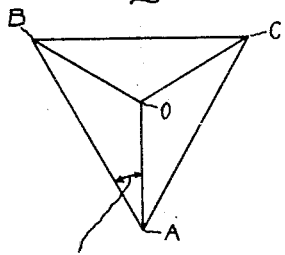

In the drawing, Fig. 1 is a diagrammatic illustration of an embodiment of the invention and Fig. 2 is a vector diagram for showing the phase relations between the currents and voltages in a three-phase circuit at unity power factor.

Referring now to the drawing, I have shown my invention arranged for use with a circuit 1 for measuring the voltage of a main three-phase alternating current power circuit 2 having three conductors A, B and C. The voltage measuring circuit 1 is connected between conductors A and B by a conventional potential transformer 3 and is arranged to energize a voltage measuring device in the form of a voltage regulating relay or contact making voltmeter 4. This device has separate sets of contacts which are arranged to close when the main circuit voltage is above or below a normal value and by means of conventional circuits these contacts may be made to control the proper operation of a suitable voltage regulator (not shown) for main circuit 2.

The line drop compensator proper is shown schematically at 5 as consisting of a resistance element 6 and a reactance element 7. A current transformer 8 in main conductor A is connected to circulate a current proportional to the current in conductor A through both the resistance element 6 and the reactance element 7. By means of adjustable connections 9 and 10 the magnitude of the respective voltage drops in the resistor 6 and the reactor 7 may be adjusted at will. For example, adjuster 9 may be set to cause a resistance voltage drop in resistor 6 which is proportional to the resistance voltage drop in a given length of conductor A and adjuster 10 may be made to set to cause a reactance voltage drop in reactor 7 which is proportional to the reactance voltage drop in the same length of conductor A.

If the voltage between conductors A and B were in phase with the current in conductor A at unity power factor, as would be the case if conductors A and B constituted a single-phase circuit, the resistance and reactance elements could be connected directly in the voltage measuring circuit 1 and the voltage drops in these devices would then give correct line drop compensation. However, reference to Fig. 2 shows that in a three-phase circuit this voltage and current are 30° out of phase; thus, at unity power factor on main circuit 2 the current in conductor A will be in phase with the voltage to neutral of conductor A, shown in the diagram as vector OA, while the voltage between the conductors A and B is represented by the vector AB. If a counter-clockwise phase rotation ABC exists in circuit 2 it will be seen that at unity power factor the current in conductor A lags the voltage between conductors A and B by 30°, while if a clockwise phase rotation ACB is assumed the current in conductor A will lead the voltage between conductors A and B by 30°.

I have found that correction can be made for the lagging condition by connecting a properly proportioned reactor 11 in shunt with both the resistance and reactance elements of the compensator. This may be done by a suitable switch 12 which in its illustrated position makes this connection. If the resistance element 6 has a value R and the reactance element 7 has a reactance value X, the necessary value of pure shunt reactance for correcting for a 30° lagging condition of the current will be $1.73R-X$.

The derivation of this value is as follows: It is assumed that the current drawn by the voltage regulating relay 4 is negligible. This assumption is justifiable because the current drawn by a properly designed voltage measuring instrument is always very small in order that the voltage drop caused by this current will not introduce an error in the response of the device. The following terminology is employed.

$I_1$ = the output current of the current transformer 8.
$I_c$ = the current circulated through an adjustable portion $a$ of the resistance R of element 6 and through an adjustable portion $b$ of the reactance X of element 7.
$I_2$ = the current circulated through the shunt reactor 11. This current $I_2$ also flows through the external portion $(1-a)$ of the resistance R of compensator element 6 and through the external portion $(1-b)$ of the reactance X of the compensator element 7.
$X_2$ = the reactance of the shunt reactor 11.
$E_{co}$ = the terminal voltage of the compensator without the shunt 11.
$E_{cs}$ = the terminal voltage of the compensator with the shunt 11.

By inspection it follows from the illustrated diagram that (1) $$E_{co} = (aR + jbX)I_1$$

and that (2) $$E_{cs} = jX_2 I_2 = (aR + jbX)I_c - (1-a)R + j(1-b)XI_2$$

Collecting the terms in $I_2$ and solving this equation for $I_2$ we obtain (3) $$I_2 = \frac{aR + jbX}{(1-a)R + j(1-b)X + jX_2} I_c$$

By inspection it is obvious that $I_1$ equals the sum of $I_2$ and $I_c$. Therefore (4) $$I_2 = I_1 - I_c$$

By substituting the value of $I_c$ obtained from Equation 3 in Equation 4, $I_2$ in terms of $I_1$ will be (5) $$I_2 = \frac{aR + jbX}{R + j(X + X_2)} I_1$$

Then if $E_{cs}$ is to lead $E_{co}$ by 30°

(6) $$jX_2 I_2 = jX_2 \frac{aR + jbX}{R + j(X + X_2)} I_1 = K(.866 + j.5)(aR + jb)XI_1$$

Solving this equation for $jX_2$ we obtain (7) $$jX_2 = K(.866 + j.5)R + j(X + X_2) = K.866R - .5(X + X_2) + j.5R + .866(X + X_2)$$

As $X_2$ is assumed to be a pure reactance the real term in Equation 7 is 0 so that (8) $$.866R - .5(X + X_2) = 0$$

and (9) $$jX_2 = jK.5R + .866(X + X_2)$$

Solving Equation 8 for $X_2$ we obtain

(10) $$X_2 = 1.732R - X$$

Substituting this value of $X_2$ in Equation 9 and solving for K we obtain

(11) $$K = .866 - \frac{X}{2R}$$

The factor K indicates that when the reactance $X_2$ is the necessary value to advance the phase of the voltage $E_{cs}$ ahead of $E_{co}$ so as to compensate for a 30° lag of the current, the voltage $E_{cs}$ is different from the voltage $E_{co}$ by the factor K. Consequently, if the same compensator settings are to be maintained when the compensator voltage is advanced 30° in phase it is usually necessary to increase the voltage $E_{cs}$. As shown, this is done by means of a tapped auto-transformer 13 which, by means of the switch 12, is connected so as to step up the voltage $E_{cs}1/K$ times.

If now the phase rotation of the main circuit is in the opposite direction so that the current leads the voltage by 30°, the compensator voltage may be retarded 30° in phase so as to secure correct line drop compensation by means of a capacitor 14 connected in shunt with the resistance and reactance elements of the compensator. This may be readily done by moving the switch 12 to its dotted position.

The necessary value of shunt capacitance to retard the phase 30° is $1.73R + X$ and the shunt connection of such a valued capacitor changes the voltage magnitude of the compensator by a factor $$.866 + \frac{X}{2R}$$

These two values may be derived in the manner already explained for the shunt reactor, the only difference in the derivation being that the quantity $.866 + j.5$ is replaced by $(.866 - j.5)$ and the rest of the derivation modified accordingly.

The above derivations of the values of $X_2$ and K may be generalized as follows so as to give expressions for any desired angle of phase shift. If $E_{cs}$ is to lead or lag $E_{co}$ by the angle $$\tan^{-1}\frac{d}{c}$$

where $d$ may be positive or negative and $$c^2 + d^2 = 1$$

we obtain from Equation 6

(12) $$jX_2 I_2 = jX_2 \frac{aR + jbX}{R + j(X + X_2)} I_1 = K(c + jd)(aR + jbX)I_1$$

whence

(13) $$jX_2 = KcR - d(X + X_2) + jdR + c(X + X_2)$$

(14) $$X_2 = \frac{cR}{d} - X$$

and

(15) $$K = c - \frac{dX}{R}$$

Since the equations hold for any relative values of R and X it would be possible to have a series resistor or a series reactor external to the compensator with the shunt reactor or shunt capacitor shunted across the compensator and the external resistor or reactor or both.

The change in magnitude of the voltage $E_{ca}$ caused by the shunt capacitor will ordinarily be such as to increase $E_{ca}$ with respect to $E_{co}$ and, consequently, this voltage is stepped down by a tap on the auto-transformer 13, a proper connection is made by the switch 12, as shown in its dotted position.

In order that an economical size capacitor 14 may be employed the voltage of this capacitor is stepped up by an extension 15 on the auto-transformer across which the capacitor 14 is connected.

When the switch 12 is placed in a position midway between the illustrated position and the dotted position, the shunt devices 11 and 14 are out of circuit and the auto-transformer 13 is connected for a 1:1 ratio so that in this position of the switch the compensator is adapted for operation with single-phase main circuits in which the current and voltage are in phase at unity power factor.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a main alternating current circuit having a voltage which leads the current therein by 30° at unity power factor, a line drop compensator having a resistance element of value R and a reactance element of value X effectively serially connected with each other, an auxiliary circuit for measuring said voltage of said main circuit, said elements being adapted to have circulated through adjustable portions thereof a current proportional to the current of said main circuit, said adjustable portions of said elements being proportional respectively to the resistance and reactance of a given length of said main circuit, a reactor having a reactance value which is substantially (1.73R−X) connected in shunt with both of said elements, and means interconnecting said compensator and said auxiliary circuit for inserting $$\frac{1}{\left(.866-\frac{X}{2R}\right)}$$

times the voltage across said compensator and reactor in said auxiliary circuit.

2. In combination, a main alternating current circuit having a voltage which lags the current therein by 30° at unity power factor, a line drop compensator having a resistance element of value R and a reactance element of value X effectively serially connected with each other, an auxiliary circuit for measuring said voltage of said main circuit, said elements being adapted to have circulated through adjustable portions thereof a current proportional to the current of said main circuit, said adjustable portions of said main elements being proportional respectively to the resistance and reactance of a given length of said main circuit, a capacitor having a reactance value which is substantially (1.73R+X) connected in shunt with both of said elements, and means interconnecting said compensator and said auxiliary circuit for inserting $$\frac{1}{\left(.866+\frac{X}{2R}\right)}$$

times the voltage across said compensator and capacitor in said auxiliary circuit.

3. In an automatic voltage regulating system, an alternating current power circuit having a voltage and current which are out of phase when said circuit is operating at unity power factor, a voltage regulator for said circuit having a control circuit connected to respond to said voltage and having a line drop compensator connected to respond to said current, said compensator having separate resistance and reactance elements arranged to be set directly in terms of the resistance and reactance respectively of said power circuit, and means for shifting the phase of the compensator voltage through the angle by which said power circuit voltage and current are out of phase at unity power factor comprising a reactive element connected in shunt circuit relation with both elements of said compensator.

4. In combination, a main alternating current circuit, an auxiliary circuit connected in shunt with said main circuit, a voltage drop compensator having a resistance element and a reactance element effectively connected in said auxiliary circuit, means for circulating a current in said compensator which is proportional to the current in said main circuit, and means for shifting the phase of the voltage of said compensator through a substantial angle of not less than thirty degrees comprising an impedance of predetermined value connected in shunt with both said resistance and reactance elements of said compensator, the total effective value of said shunt impedance being substantially less than that of the primary circuit of a conventional potential transformer.

5. In combination, a main alternating current circuit having a voltage which leads the current therein by 30° at unity power factor, a line drop compensator having a resistance element of value R and a reactance element of value X effectively serially connected with each other, an auxiliary circuit for measuring said voltage of said main circuit, said elements being adapted to have circulated through adjustable portions thereof, a current proportional to the current of said main circuit, said adjustable portions of said elements being proportional respectively to the resistance and reactance of a given length of said main circuit, a reactor having a reactance value which is substantially (1.73R−X) connected in shunt necting said compensator and said auxiliary circuit for inserting a function of the voltage across said compensator in said auxiliary circuit.

6. In combination, a main alternating current circuit having a voltage which lags the current therein by 30° at unity power factor, a line drop compensator having a resistance element of value R and a reactance element of value X effectively serially connected with each other, an auxiliary circuit for measuring said voltage of said main circuit, said elements being adapted to have circulated through adjustable portions thereof a current proportional to the current of said main circuit, said adjustable portions of said elements being proportional respectively to the resistance and reactance of a given length of said main circuit, a capacitor having a reactance value which is substantially (1.73R+X) connected in shunt with both of said elements and means interconnecting said compensator and said auxiliary circuit for inserting a function of the voltage across said compensator in said auxiliary circuit.

7. In combination, an alternating current circuit, a resistance element of value R, a reactance element of value X, means for circulating a current which is proportional to the current in said alternating current circuit through both of said elements, a second circuit connected to said elements so as to have a voltage inserted therein which corresponds to the vector sum of the voltage drops in said elements caused by the current circulated therethrough, and means for shifting the phase of said voltage through an angle whose tangent is $$\frac{d}{c}$$

where $d$ may be positive or negative and $$c^2 + d^2 = 1$$

comprising a substantially pure reactance connected in shunt circuit relation with both of said elements and having a value $$\frac{cR}{d} - X$$

8. In combination, an alternating current circuit, a resistance element of value R, a reactance element of value X, means for circulating a current which is proportional to the current in said alternating current circuit through both of said elements, a second circuit connected to said elements so as to have a voltage inserted therein which corresponds to the vector sum of the voltage drops in said elements caused by the current circulated therethrough, means for shifting the phase of said voltage through an angle whose tangent is $$\frac{d}{c}$$

where $d$ may be positive or negative and $$c^2 + d^2 = 1$$

comprising a substantially pure reactance connected in shunt circuit relation with both of said elements and having a value $$\frac{cR}{d} - X$$

and a transformer for changing the magnitude of the phase shifted voltage by the factor $$\frac{1}{c - \frac{dX}{R}}$$

9. In an automatic voltage regulating system for an alternating current power circuit, a primary control circuit connected to be responsive to the voltage of said power circuit, a line drop compensator comprising an adjustable resistance element and an adjustable reactance element connected in series with each other in said control circuit, means limited to a single current transformer for passing through said elements a current proportional to the current in said power circuit so as to produce a voltage drop therein which is proportional to the line drop in said power circuit, means for shifting the phase of said voltage drop through various angles corresponding to the phase displacement at unity power factor between the voltage and current of various power circuits comprising a plurality of different impedances of predetermined characteristics, and means for selectively connecting said impedances in parallel with said line drop compensator.

10. In an automatic voltage regulating system for an alternating current power circuit, a primary control circuit connected to be responsive to the voltage of said power circuit, a line drop compensator comprising an adjustable resistance element and an adjustable reactance element connected in series with each other in said control circuit, means limited to a single current transformer for passing through said elements a current proportional to the current in said power circuit so as to produce a voltage drop therein which is proportional to the line drop in said power circuit, means for advancing and retarding the phase of said voltage drop through equal angles corresponding to the phase displacement at unity power factor between a line-to-line voltage of a three-phase power circuit and the currents in the two lines between which said line-to-line voltage exists comprising a plurality of impedances of different characteristics, and means for selectively connecting said impedances in parallel with said line drop compensator.

11. In an automatic voltage regulating system for an alternating current power circuit, a primary control circuit connected to be responsive to the voltage of said power circuit, a line drop compensator comprising an adjustable resistance element and an adjustable reactance element connected in series with each other in said control circuit, means limited to a single current transformer for passing through said elements a current proportional to the current in said power circuit so as to produce a voltage drop therein which is proportional to the line drop in said power circuit, means for shifting the phase of said voltage drop through various angles corresponding to the phase displacement at unity power factor between the voltage and current of various power circuits comprising a plurality of different impedances of predetermined characteristics, and means for correcting the magnitude of the compensator voltage for the changes therein caused by the selective parallel connection of said impedances.

12. In an automatic voltage regulating system for an alternating current power circuit, a primary control circuit connected to be responsive to the voltage of said power circuit, a line drop compensator comprising an adjustable resistance element and an adjustable reactance element connected in series with each other in said control circuit, means limited to a single current transformer for passing through said elements a current proportional to the current in said power circuit so as to produce a voltage drop therein which is proportional to the line drop in said power circuit, means for advancing and retarding the phase of said voltage drop through equal angles corresponding to the phase displacement at unity power factor between a line-to-line voltage of a three-phase power circuit and the currents in the two lines between which said line-to-line voltage exists comprising a plurality of impedances of different characteristics, and means operated coincidentally with said last-mentioned means for correcting the magnitude of the compensator voltage for the changes therein caused by the selective parallel connection of said impedances.

HARRY R. WEST.